United States Patent
Takaoka

(10) Patent No.: US 6,658,163 B1
(45) Date of Patent: Dec. 2, 2003

(54) IMAGE PROCESSING METHOD

(75) Inventor: Naoki Takaoka, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/285,262

(22) Filed: Apr. 2, 1999

(30) Foreign Application Priority Data

Apr. 2, 1998 (JP) ............................................. 10-089893

(51) Int. Cl.[7] ................................................. G06K 9/40
(52) U.S. Cl. ....................... 382/254; 382/260; 382/190; 382/203
(58) Field of Search ................................ 382/100, 254, 382/260, 274, 308, 181, 190, 195, 203; 345/629, 632, 641

(56) References Cited

U.S. PATENT DOCUMENTS 5,987,185 A * 11/1999 Suzuki ........................ 382/263
6,343,137 B1 * 1/2002 Kimura et al. ............... 382/100

FOREIGN PATENT DOCUMENTS

JP 62-32577 2/1987

* cited by examiner

*Primary Examiner*—Tommy Lee
(74) *Attorney, Agent, or Firm*—Birch, Stewart, Kolasch & Birch, LLP

(57) ABSTRACT

An image processing method is provided to easily obtain an image, which is similar to that of which tone is intentionally changed using a special filter, without using the special filter. Highlight points are all extracted for an image for which application of striations is indicated, and a region in which a large number of highlight points concentrate, i.e., a region in which a large number of highlight points are located adjacently or closely is extracted as a bright region. Next, a parameter which defines striations to be applied to each bright region based on characteristic amounts such as brightness, size, color tint, and the like of the bright region, and striation data which indicates striations to be applied is generated. By synthesizing the generated striation data with image data and by recording an image on a recording material using the image data, an image of which tone is similar to that of an image photographed using a special filter such as a cross filter is obtained.

20 Claims, 10 Drawing Sheets

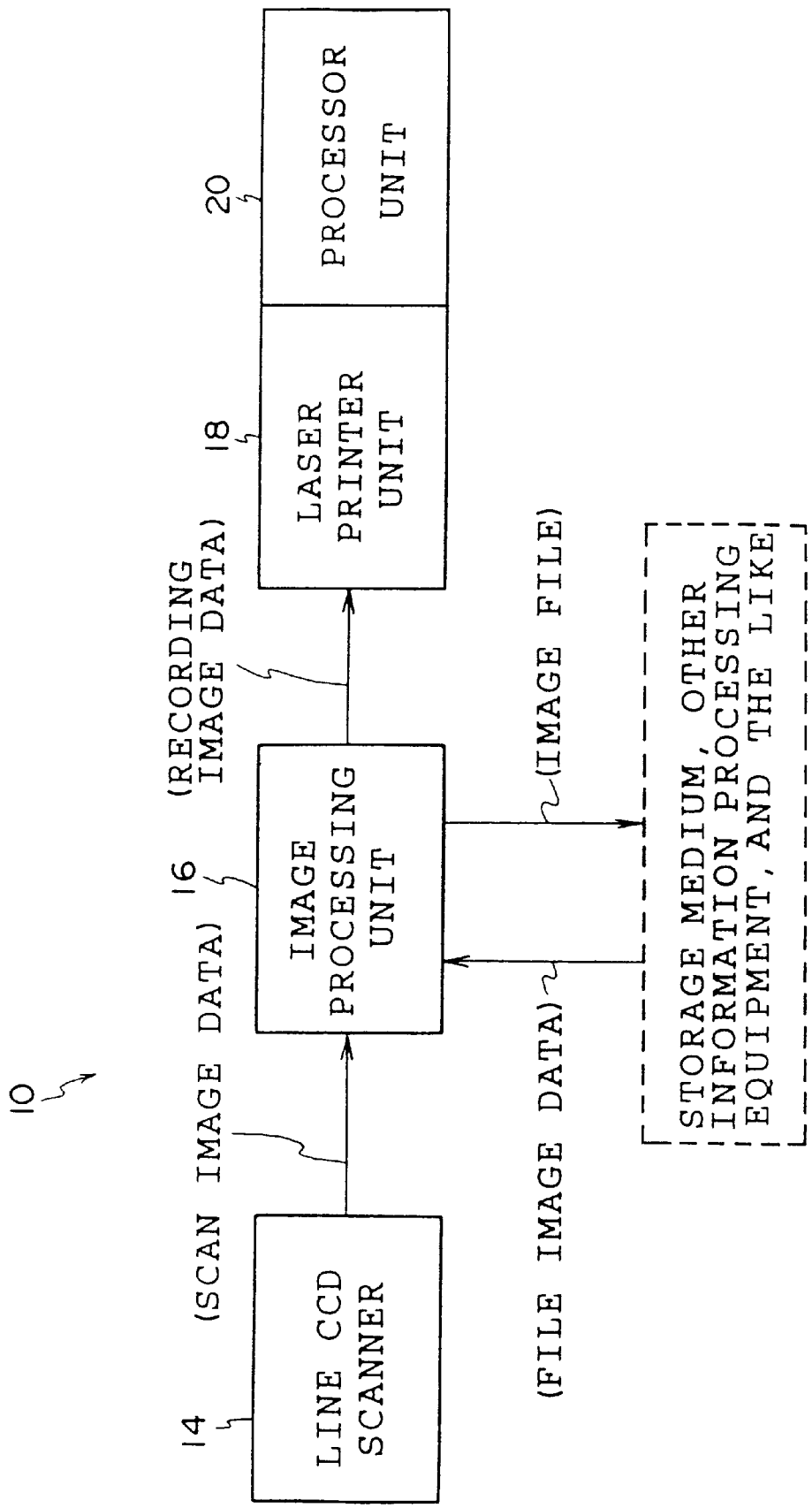

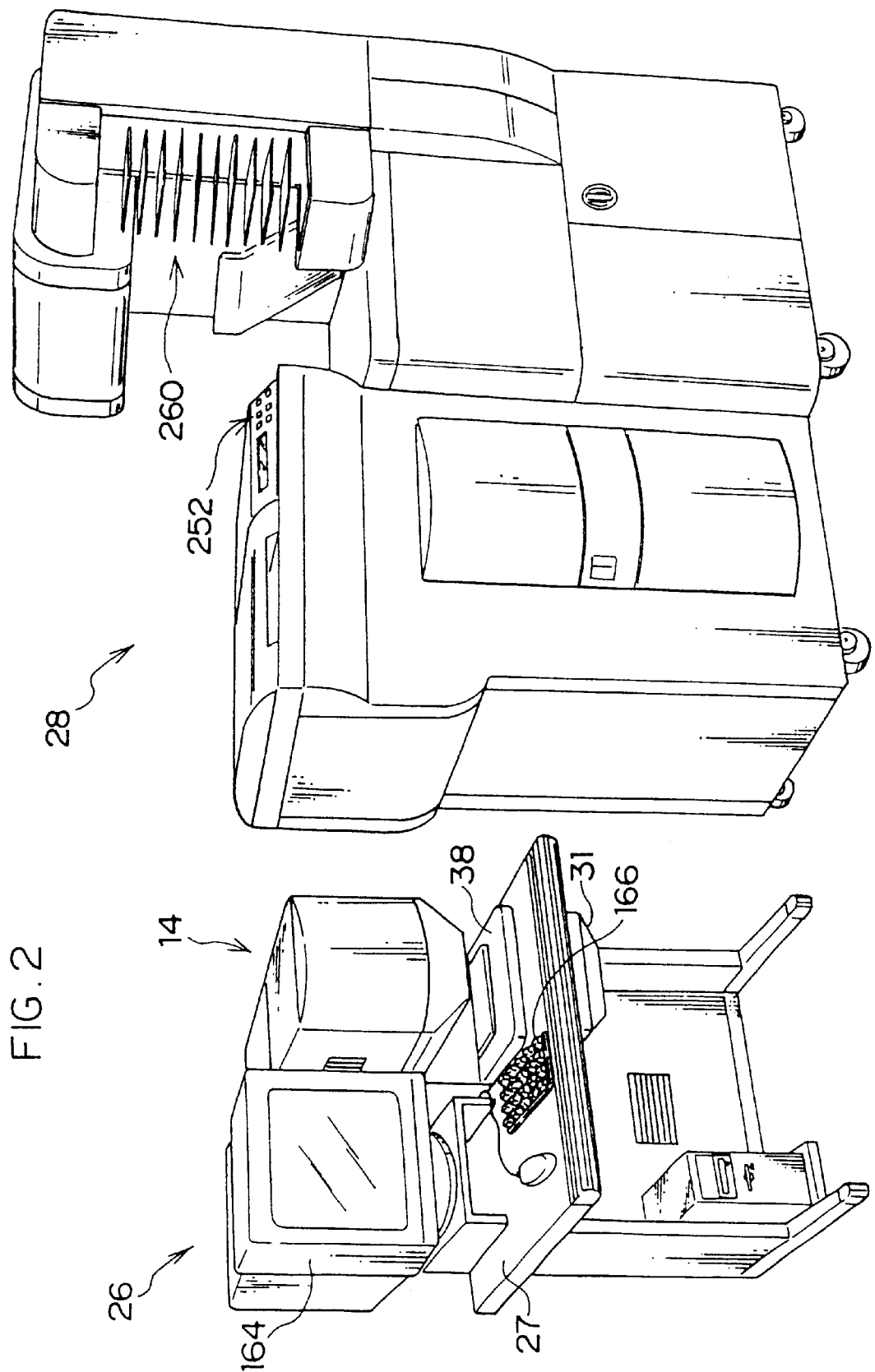

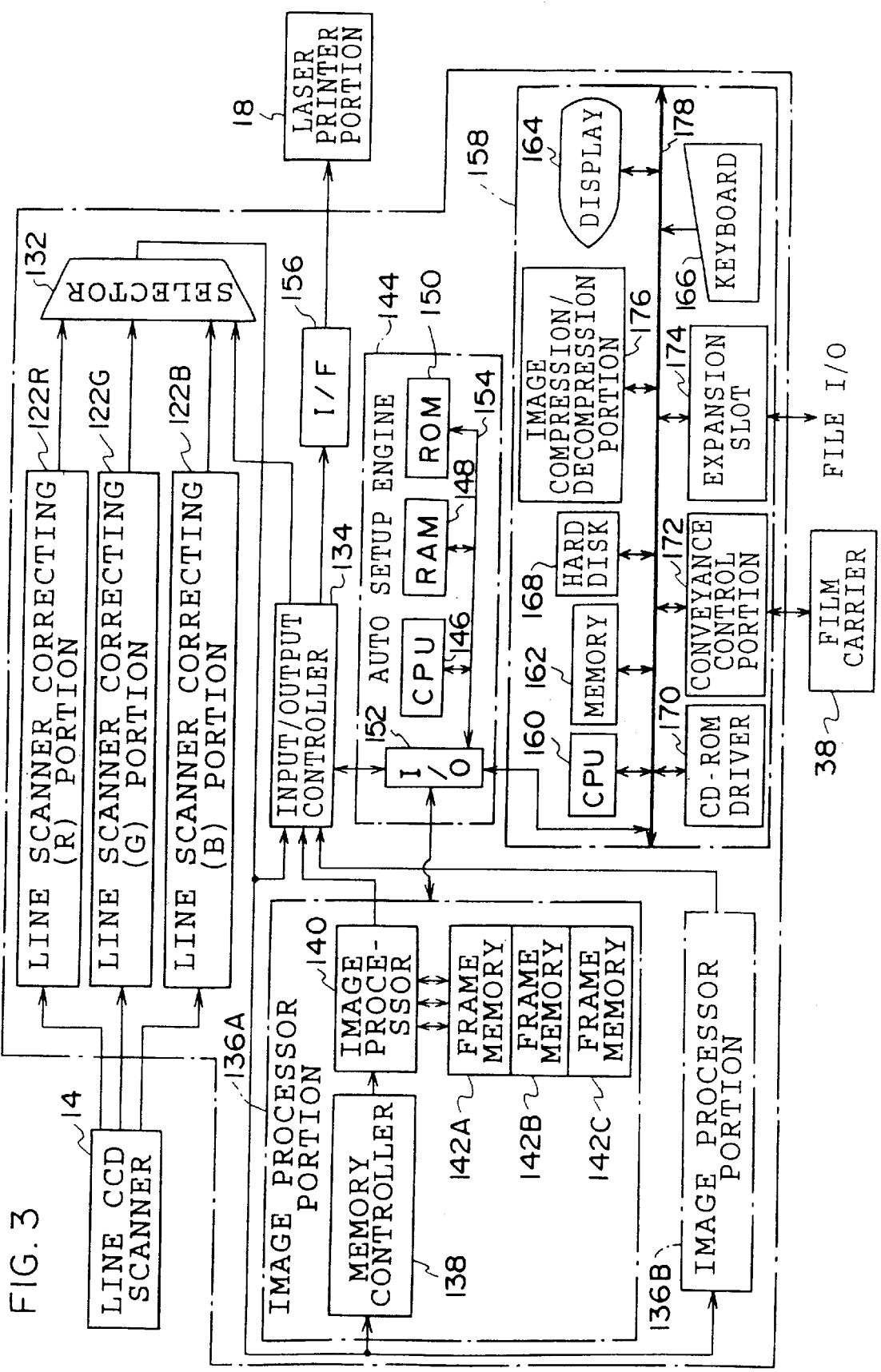

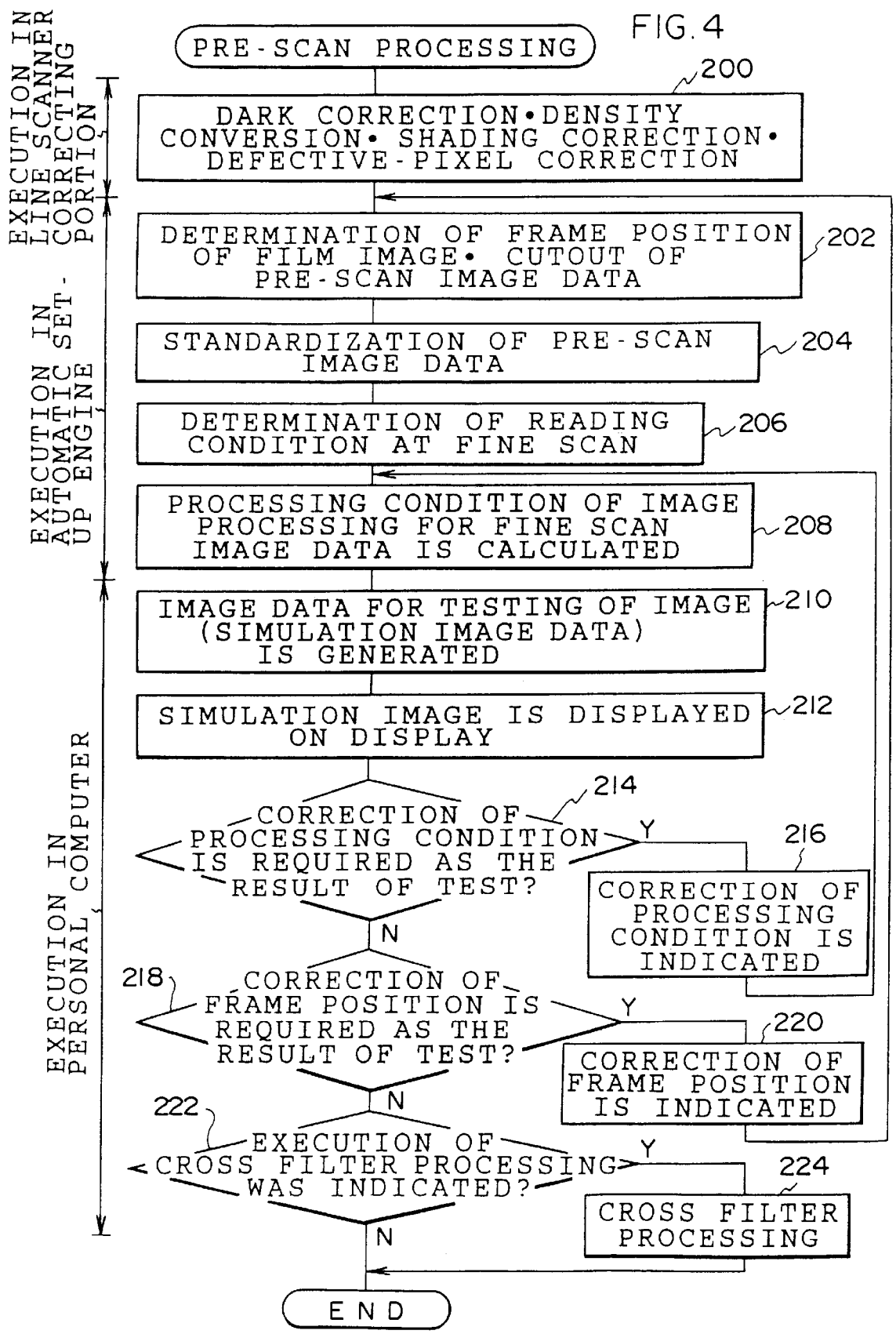

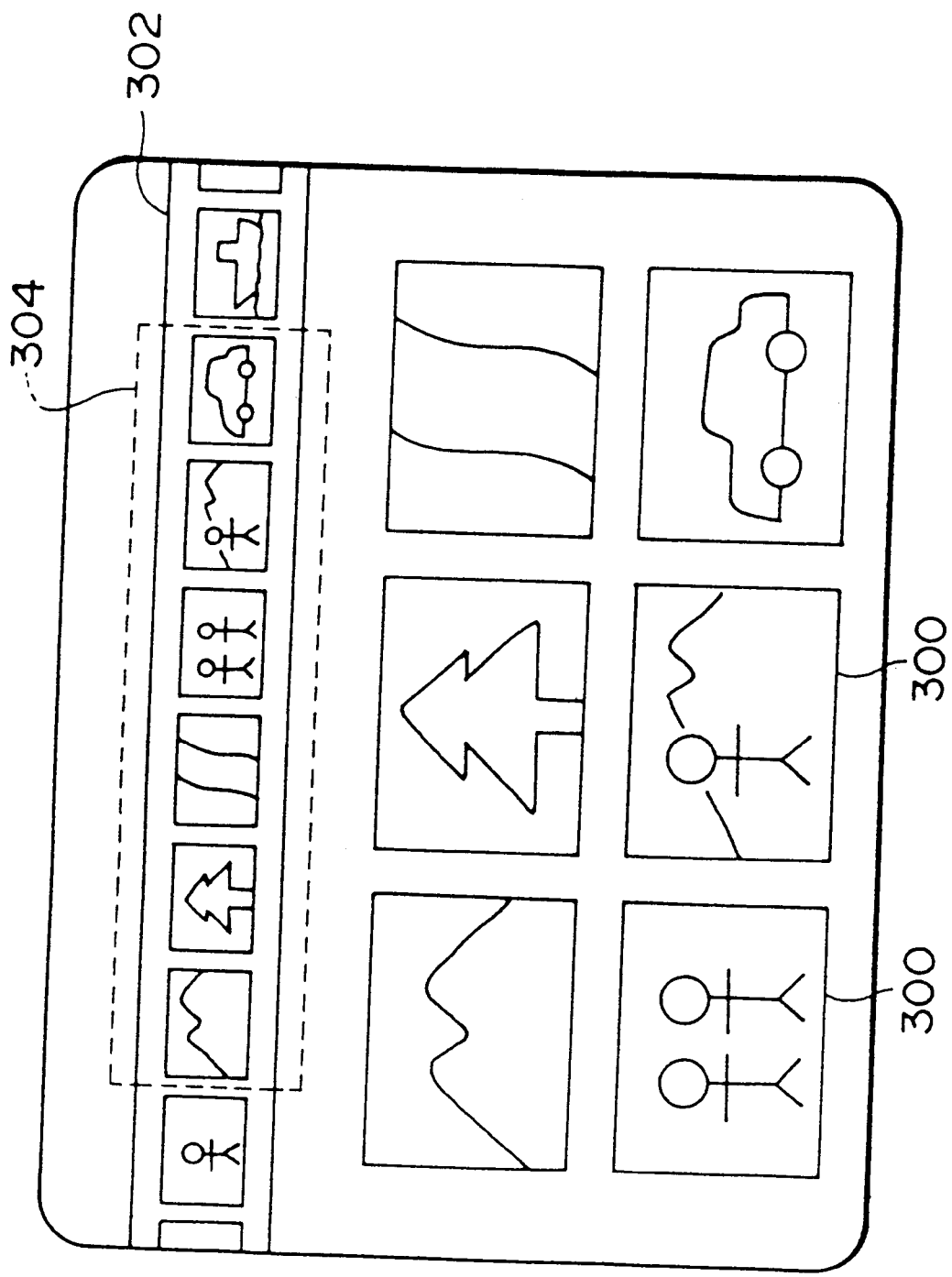

IMAGE TO BE PROCESSED

RESULT OF EXTRACTION OF BRIGHT REGION

EXTRACTED BRIGHT REGION

EXAMPLE OF DISPLAY OF TESTING IMAGE

STRIATION APPLIED BY STRIATION DATA

ONE EXAMPLE OF INSTRUCTION TO TESTING IMAGE

DESIGNATED DELETION RANGE

PRINT IMAGE

IMAGE PROCESSING METHOD

BACKGROUND OF THE INVENTION

1. Field of the Invention

The present invention relates to an image processing method, and particularly to an image processing method which intentionally changes image tone of an image represented by image data.

2. Description of the Related Art

There has conventionally been known an image processing system in which an image exposed and recorded on a photographic film is read by a film reading device equipped with a reading sensor such as a CCD sensor, image processing including various correction is effected for image data obtained by reading the image, and based on image data subjected to the image processing, the image is recorded on a recording material. This image processing system has a merit over a conventional photographic processing system in which a film image is recorded on a photographic printing paper by plain (analogue) exposure, in that the quality of a recorded image can be freely controlled by image processing for image data.

As a filter mounted to a camera when an image is exposed and recorded on a photographic film, there have been known various filters such as a color-temperature conversion filter, a color correction filter, an ND filter, and a deflection filter. In addition to the above-described filters, a special filter for intentionally changing image tone (for example, a cross filter for making one or more striations, whose center is a high-luminance region in a image, on the image in a radial manner when a sparkling surface of water or night scene is photographed) is also provided.

However, the special filter such as a cross filter is used to intentionally change image tone as described above, and therefore, it is not always used at the time of photographing. Only when photographing of a scene with image tone changed is required, the special filter is mounted in a camera by a photographer, and after photographing of the scene has been completed, the special filter is removed from the camera and is stored. Accordingly, when an image of which tone is changed is obtained, there was a problem in that handling of a special filter, which includes the need of giving attention to storage of an unused special filter, is complicated.

Further, almost all of relatively low-cost cameras such as lens-attached films and compact cameras or digital cameras which have rapidly spread in recent years does not allow mounting of filters therein. When photographing is effected using these cameras, it is not possible to obtain an image of which tone is intentionally changed using a special filter such as a cross filter.

Moreover, when a camera in which the special filter can be mounted is used, an image of which image tone is changed can be obtained only by using the special filter at the time of photographing. However, it was not possible to change the image tone of the image photographed without using the special filter after photographing, for example, observing a finished state of an image photographed without using the special filter.

SUMMARY OF THE INVENTION

The present invention has been devised in view of the above-described facts and an object thereof is to provide an image processing method in which an image equivalent to that of which tone is intentionally changed using a special filter can be easily obtained without using the special filter.

In order to achieve the above-described object, an image processing method according to a first aspect of the present invention comprises the steps of extracting a bright region in an image based on image data and, based on the extracted bright region, synthesizing striation data, which represents striations extending from the bright region, with the image data.

In the first aspect of the present invention, a bright region in an image is extracted based on image data. The above-described image data may be image data obtained by reading a film image exposed and recorded on a photographic film using an ordinary camera or an image recorded on other recording medium such as plain paper, or may be image data stored in an information storage medium by a digital camera, or may be image data which represents density or luminance. Further, according to a second aspect of the present invention, extraction of the bright region in the image can be effected by extracting highlight points in the image based on the image data and extracting a region in which highlight points concentrate.

Then, in the first aspect of the present invention, based on the extracted bright region, striation data which indicates striations extending from the bright region is synthesized with the image data. According to a third aspect of the present invention, first striation data which indicates a plurality of striations extending from the bright region in a radial manner can be used as the striation data. Further, according to the third aspect of the present invention, second striation data which indicates a striation extending from the bright region and including polygonal high-luminance regions may also be used as the striation data.

As a result, an image represented by the image data becomes an image in which striations extend from the bright region, and therefore, a tone of the image represented by the image data can be changed to that similar to an image obtained by photographing using a cross filter or the like. As described above, an image having a peculiar tone which can be obtained only by photographing using a special filter such as a cross filter whose handing has been conventionally complicated can be obtained without photographing using the cross filter or the like. For this reason, according to the first aspect of the present invention, an image similar to that whose tone is intentionally changed using a special filter such as a cross filter can be easily obtained without using the special filter such as a cross filter.

Meanwhile, the striation data to be synthesized with the image data may be generated based on the extracted bright region, for example, when the striation data is synthesized with the image data. Alternatively, when with plural kinds of striation data being in advance generated, striation data is synthesized with the image data, striation data to be synthesized may be selected from the plural kinds of striation data based on the extracted bright region.

Further, the length, width, color tint, and the like of striations appearing on a photographed image by photographing using a special filter such as a cross filter each vary in accordance with a characteristic amount of a light source (i.e., a striation generating source corresponding to the bright region on the image). For this reason, a fourth aspect of the present invention is characterized in that, in the first aspect of the present invention, parameters which define a striation to be synthesized are determined based on characteristic amounts of at least one of the brightness, size, and color tint of the extracted bright region, and the striation data is generated or selected based on the determined parameters.

In the fourth aspect of the present invention, as the parameter which defines striations, the length, width, color tint, and the like of striations are used. For example, as the brightness (luminance) of the bright region becomes high (or as the size of the bright region becomes large), the length of a striation can be increased or the width of a striation can be made larger. Further, the color tint of the striations can be determined so that, for example, the color tint of the striations coincides with the color tint of the bright region.

According to the fourth aspect of the present invention, the parameter which defines striations is determined based on at least one of characteristic amounts of brightness, size, and color tint of the bright region, and based on the determined parameter, the striation data is generated or selected. For these reasons, the striation represented by the striation data can be approximated to that appearing on a photographed image when photographing is effected using a special filter such as a cross filter. Accordingly, unnaturalness caused by the striation applied to an image during visual observation of an image can be removed by synthesizing the striation data with the image data.

Further, since there are various kinds of special filters such as a cross filter, there are also obtained various kinds of striations applied to a photographed image by a cross filter. For example, the shape of a striation appearing on a photographed image may be set in such a manner that the width of the striation is gradually made small or varies periodically as the distance from the high-luminance region increases. Further, a striation whose hue periodically varies may also be generated.

For this reason, according to a fifth aspect of the present invention, it is preferable that striation data be generated so that at least one of width and color tint of a striation varies in accordance with a distance from a bright region. In the fifth aspect of the present invention, at least one of the width and color tint of the striation is varied in accordance with the distance from the bright region, and therefore, various kinds of striations applied to a photographed image can be reproduced using various special filters.

Further, in the present invention, there is a possibility that an unnatural image be obtained if striations are applied to all of bright regions extracted from the image. For example, when a light emitter such as a fluorescent lamp, which emits homogeneous light from a relatively large area exists as a subject in an image, if striations are applied to the light emitter by extracting the light emitter as the bright region, an unnatural image is obtained. For this reason, a sixth aspect of the present invention is characterized in that, in the first aspect of the present invention, based on the shape of each the extracted bright regions, a bright region to which a striation is applied by the striation data is selected from the extracted bright regions.

In the sixth aspect of the present invention, a bright region to which striations are applied is selected based on the shape of the bright region, and therefore, by, for example, applying striations only to bright regions whose shape are circular or substantially circular, a bright region corresponding to a light emitter such as a fluorescent light, which is unnatural due to striations applied thereto, can be excluded from the bright regions to which striations are applied. Accordingly, striations can be applied to an image represented by image data without causing unnaturalness.

On the other hand, in the present invention, the image data with striation data synthesized can be used for recording an image on a recording material or can be stored in an information storage medium. In this case, as described in a seventh aspect of the present invention, prior to recording of an image on a recording material or storage in the information storage medium, an image represented by the image data (image data prior to the striation data being synthesized) or image data with the striation data synthesized is displayed on display means. Meanwhile, when the image represented by image data with the striation data synthesized is required to be displayed on the display means, prior to recording of an image on a recording material or storage in the information storage medium, the image with the striations applied thereto can be confirmed visually in advance, which is preferable.

Further, in the seventh aspect of the present invention, a bright region to which striations are applied by striation data is selected in accordance with an instruction inputted based on an image displayed on the display means and the striation data is generated, or selected, or corrected so as to be synthesized with the image data. Meanwhile, the instruction inputted based on the image displayed on the display means may be an instruction for applying striations to all of bright regions existing in a specified range of an image or may be an instruction for applying no striation to all or one of bright regions existing in the specified range. Due to generation, or selection, or correction of striation data in accordance with the above-described instruction, striations can be applied to an arbitrary one of the extracted bright regions and an image in which striations are applied to a desired bright region can be obtained.

Further, when the image data with the striation data synthesized is used for recording an image on a recording material, it is necessary to execute gradation conversion which converts a density range of an image represented by image data in accordance with a range reproduced as an image on a recording material, and there is a possibility that a value of data of a high-luminance region in an image (i.e., a region in which a density is the minimum value or near the minimum value) may be saturated accompanied with the gradation conversion. In this case, an image represented by image data after gradation conversion becomes an image in which the high-luminance region is a white point. For this reason, information relating to color tint of the bright region is lost, and when the striation data is synthesized with image data subjected to gradation conversion, striations represented by the synthesized striation data may be seen unnaturally as compared with an image represented by the image data subjected to gradation conversion.

For this reason, an eighth aspect of the present invention is characterized in that, in the first aspect of the present invention, after the striation data is synthesized with the image data, the image data with the striation data synthesized is subjected to gradation conversion used for recording an image on a recording material. According to the eighth aspect of the present invention, the gradation conversion is performed after the striation data is synthesized with the image data, and therefore, the gradation conversion is performed simultaneously under the same condition for gradation conversion also for the striation data with the image data synthesized. Accordingly, the striation represented by the striation data can be prevented from being seen unnaturally.

Further, according to the fourth aspect of the present invention, even when the parameter which defines striations is determined based on characteristic amounts such as color tint of the bright region, any image data prior to gradation conversion includes, as information, characteristic amounts such as color tint of the bright region, and therefore, the characteristic amounts of the bright region can be accurately extracted by extracting the characteristic amounts of the bright region using the image data prior to gradation conversion.

BRIEF DESCRIPTION OF THE DRAWINGS

FIG. 1 is a schematic block diagram of a digital laboratory system according to an embodiment of the present invention.

FIG. 2 is an outside view of the digital laboratory system.

FIG. 3 is a block diagram which schematically shows the structure of an image processing section.

FIG. 4 is a flow chart which shows contents of pre-scan processing executed in the image processing section.

FIG. 5, is an image diagram which shows an example of a simulation image on a display.

FIG. 8A is a diagram showing an example of an image to be processed in cross filter processing; FIG. 8B is a diagram showing an example of a result of extraction of a bright region in cross filter processing; FIG. 8C is a diagram showing an example of a testing image with striations applied thereto in cross filter processing; FIG. 8D is a diagram showing an example of instruction to the testing image with striations applied thereto in cross filter processing; and FIG. 8E is a diagram showing an example of a print image in cross filter processing.

DESCRIPTION OF THE PREFERRED EMBODIMENTS

Figure 6A:
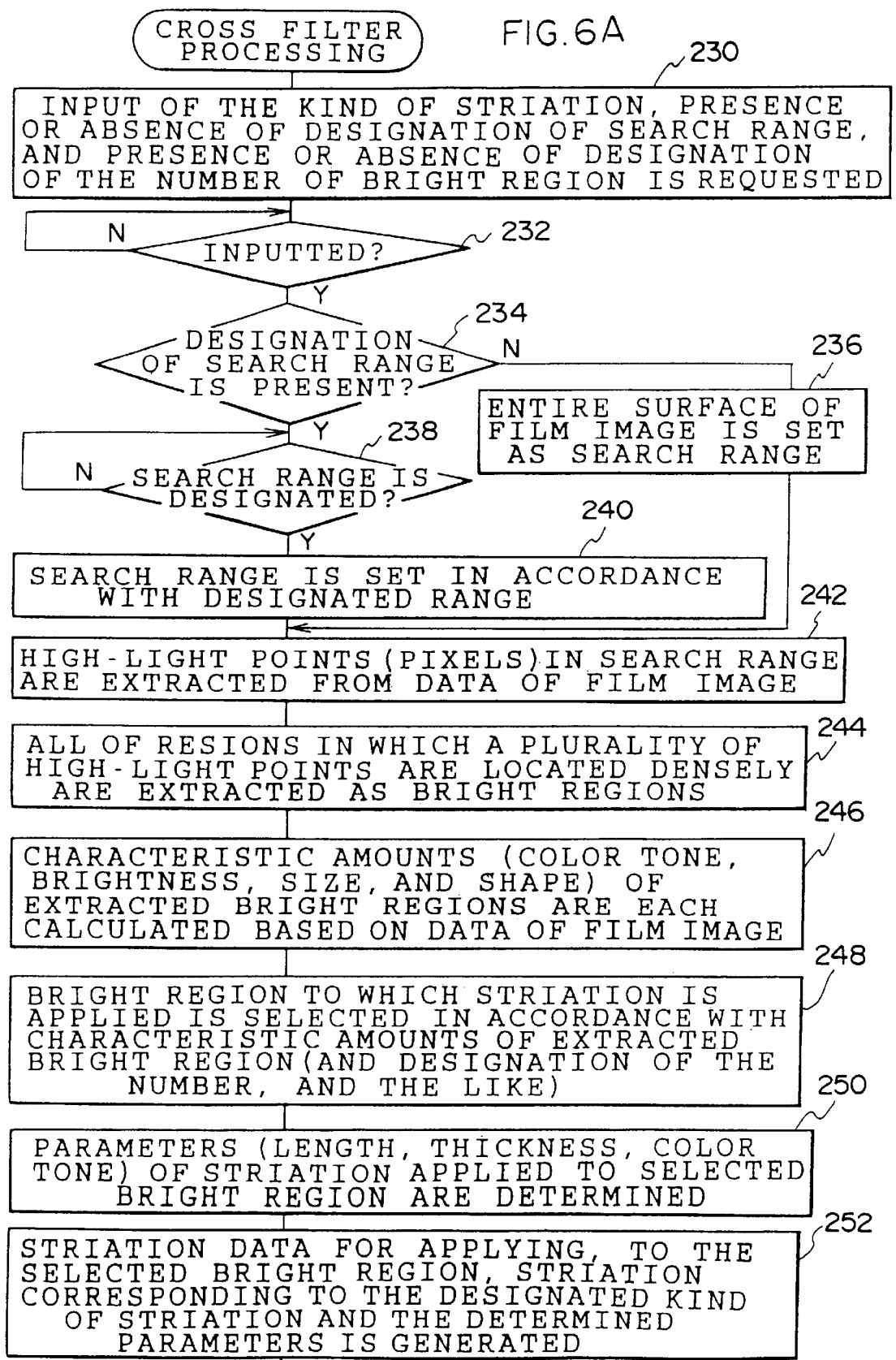
FIGS. 6A and 6B are flow chart which shows contents of cross filter processing executed by a personal computer of the image processing section.

Referring now to the attached drawings, an embodiment of the present invention will be hereinafter described in detail. First, a description will be given of a digital laboratory system to which the present invention can be applied.

Overview of the Entire System

FIG. 1 shows a schematic structure of a digital laboratory system 10 according to the embodiment of the present invention. FIG. 2 shows the exterior appearance of the digital laboratory system 10. As shown in FIG. 1, the laboratory system 10 is structured to include a line CCD scanner 14, an image processing section 16, a laser printer section 18, and a processor section 20. The line CCD scanner 14 and the image processing section 16 are integrated to form an input section 26 shown in FIG. 2. The laser printer section 18 and the processor section 20 are integrated to form an output section 28 shown in FIG. 2.

The line CCD scanner 14 is used to read a film image recorded on a photographic film such as a negative film and a reversal film. Examples of the photographic film on which a film image to be read is recorded include a photographic film in 135 magazines, a photographic film in 110 magazines, a photographic film with a transparent magnetic layer formed thereon (i.e., a photographic film in 240 magazines: a so-called APS film), and photographic films in 120 magazines and 220 magazines (Brownie size). The line CCD scanner 14 reads the above-described film images to be read by a three-line color CCD and outputs image data of R, G, and B.

The image processing section 16 is structured to be inputted image data (scan data) outputted from the line CCD scanner 14 and also to be inputted image data obtained by photographing using a digital camera, image data obtained by reading an original (for example, a reflection original) other than the film image by a scanner, image data generated by a computer, and the like (which will be generically referred to as file image data) from the outside (for example, inputted of such image data via a storage medium such as a memory card or inputted of such image data from the other information processing equipment via a communication line).

The image processing section 16 effects image processing including various correction and the like for the input image data and outputs the image data, as recording image data, to the laser printer section 18. Further, the image processing section 16 also can output the image data subjected to the image processing, as an image file, to the outside (for example, the image data can be outputted to a storage medium such as a memory card or transferred to the other information processing equipment via a communication line).

The laser printer section 18 includes laser light sources of R, G, and B and applies laser light modulated in correspondence with the recording image data inputted from the image processing section 16 onto a photographic printing paper, so as to record an image on the photographic printing paper by scan exposure. Further, the processor section 20 effects various processing including color development, bleach-fix, washing, and drying for the photographic printing paper on which an image is recorded by scan exposure in the laser printer section 18. As a result, an image is formed on the photographic printing paper.

Structure of Image Processing Section

Next, the structure of the image processing section 16 will be described with reference to FIG. 3. The image processing section 16 includes line scanner correcting portions 122R, 122G, and 122B so as to correspond to data of R, G, and B inputted from the line CCD scanner 14. The line scanner correcting portions 122R, 122G, and 122B have the same structures and will be hereinafter referred generically to as "line scanner correcting portion 122" without distinctions of the three portions.

The line scanner correcting portion 122 effects each processing of dark correction, density conversion, shading correction, and defective-pixel correction for scan data inputted from the line CCD scanner 14. The dark correction is performed by storing, for each of cells, data inputted from the line CCD scanner 14 (i.e., data which represents a dark output level of each of cells of a line CCD) in the state in which the side of the line CCD of the line CCD scanner 14 on which light is made incident is cut off and by subtracting the dark output level of a cell corresponding to each pixel from scan data inputted from the line CCD scanner 14 by the line CCD reading a photographic film.

The line scanner correcting portion 122 includes a lookup table (LUT) in which data used for logarithmic conversion is stored. The above-described density conversion is performed by converting data subjected to dark correction (the data represents an amount of light made incident on the line CCD) to data which represents the density of a photographic film set in the line CCD scanner 14 by the above-described LUT. Further, the line scanner correcting portion 122 stores therein data (shading data) obtained by causing homogeneous light to be made incident on each of cells of the line CCD in a state in which the photographic film is not set in the line CCD scanner 14. The above-described shading correction is performed by correcting density-converted data based on the shading data per pixel unit at the time of reading the photographic film.

On the other hand, there is a possibility that, in the CCD sensor, due to a balance to yielding during manufacture, a cell from which a signal exactly corresponding to an amount of incident light is not outputted (a so-called defective pixel) exists from the time of shipment, or a defective pixel may be generated with the lapse of time. Accordingly, the line scanner correcting portion 122 in advance determines as to whether a defective pixel exists, and when the defective pixel exists, it stores therein an address of the defective pixel. Among data subjected to the shading correction, data of the defective pixel is interpolated from data of its peripheral pixels and new data is generated (correction of the defective pixel).

An output end of the line scanner correcting portion 122 is connected to an input end of a selector 132 and data subjected to various processing including dark correction, density conversion, shading correction, and defective-pixel correction is inputted, as scan data, to the selector 132. Further, an input end of the selector 132 is also connected to a data output end of an input/output controller 134 and file image data inputted from the outside is inputted from the input/output controller 134 to the selector 132. An output end of the selector 132 is connected to each of data input ends of the input/output controller 134 and image processor portions 136A, 136B. The selector 132 can selectively output the inputted image data to each of the input/output controller 134 and the image processor portions 136A, 136B.

The image processor portion 136A includes a memory controller 138, an image processor 140, and three frame memories 142A, 142B, and 142C. The frame memories 142A, 142B, and 142C each have a capacity which allows storage of image data of a film image of one frame. The image data inputted from the selector 132 is stored in any one of the three frame memories 142 and the memory controller 138 controls an address when the image data is stored in the frame memory 142 so that respective data of pixels of the inputted image data are stored in a storage region of the frame memory 142 in a state of being arranged in a fixed order.

The image processor 140 fetches image data stored in the frame memory 142 and performs various image processing including gradation conversion, color conversion, hypertone processing which compresses gradation of extra-low frequency luminance components of an image, hyper-sharpness processing which highlights sharpness while suppressing granularity, and the like. Meanwhile, processing conditions of the above-described image processing is automatically calculated by an automatic set-up engine 144 (which will be described later) and the image processing is carried out in accordance with the calculated processing condition. The image processor 140 is connected to the input/output controller 134, and after the image data subjected to the image processing is temporarily stored in the frame memory 142, the image data is outputted to the input/output controller 134 at a predetermined time. The image processor portion 136B has the same structure as that of the above-described image processor portion 136A, and a description thereof will be omitted.

In the present embodiment, two reading operations at different resolutions are effected for each film image in the line CCD scanner 14. In the case of the first reading operation at a relatively low resolution (which will be referred to as "pre-scan"), even when the density of a film image is extremely low (for example, even when an under-exposed negative image on a negative film is used), reading of an entire photographic film is performed under a reading condition which is determined so as to prevent occurrence of saturation of accumulated charge in the line CCD (the amount of light irradiated on the photographic film for each wavelength of light of colors R, G, and B, and the time of charge accumulated in the line CCD). The data obtained by the pre-scan (i.e., pre-scan data) is inputted from the selector 132 to the input/output controller 134 and is also outputted to the automatic set-up engine 144 connected to the input/output controller 134.

The automatic set-up engine 144 includes CPU 146, RAM 148 (for example, DRAM), ROM 150 (for example, ROM which can rewrite stored contents), and an input/output port 152, which are connected together via a bus 154.

The automatic set-up engine 144 determines, based on pre-scan data inputted from the input/output controller 134, a frame position of a film image and extracts data (pre-scan image data) corresponding to a region of the photographic film on which the film image is recorded. Further, the automatic set-up engine 144 determines, based on the pre-scan image data, the size of the film image and calculates an image characteristic amount such as density and determines a reading condition for a photographic film subjected to pre-scan during second reading by the line CCD scanner 14 at a relatively high resolution (which will be hereinafter referred to as fine scan). Then, the frame position, the type, and the reading condition are outputted to the line CCD scanner 14.

Further, the automatic set-up engine 144 calculates, based on pre-scan image data of film images of a plurality of frames, a processing condition of image processing for image data (fine scan image data) obtained by the line CCD scanner 14 performing fine scan, and outputs the calculated processing condition to the image processor 140 of the image processor portion 136.

In the calculation of the processing condition of image processing, it is determined from an exposure amount during photographing, a type of a light source for photographing, and other characteristic amounts, whether a plurality of film images with similar scenes photographed exists. When the plurality of film images with similar scenes photographed exist, the processing conditions of image processing for fine-scan image data of these film images are determined so as to be the same or approximate to one another.

Meanwhile, an optimum processing condition of image processing changes depending on whether image data after image processing is used for recording of an image on a photographic printing paper in the laser printer section 18 or is outputted externally. The image processing section 16 includes two image processor portions 136A, 136B. For example, when image data is used for recording of an image on a photographic printing paper and is also outputted externally, the automatic set-up engine 144 calculates a processing condition most suitable for each of various applications and outputs the calculated processing condition to the image processor portions 136A, 136B. As a result, in the image processor portions 136A, 136B, image processing is carried out for the same fine-scan image data under different processing conditions.

Moreover, the automatic set-up engine 144 calculates, based on pre-scan image data of the film image inputted from the input/output controller 134, an image-recording parameter which defines gray balance when an image is recorded on a photographic printing paper in the laser printer section 18, and outputs the calculated parameter simultaneously with outputting of recording image data (described later) to the laser printer section 18. Further, the automatic set-up engine 144 calculates a processing condition for image processing for file image data inputted from the outside in the same way as the aforementioned.

The input/output controller 134 is connected via an I/F circuit 156 to the laser printer section 18. When the image data subjected to image processing is used for recording an image on a photographic printing paper, image data subjected to image processing in the image processor portion 136 is outputted, as recording image data, from the input/output controller 134 to the laser printer section 18 via the I/F circuit 156. Further, the automatic set-up engine 144 is connected to a personal computer 158. When the image data subjected to image processing is outputted externally as an image file, the image data subjected to image processing in the image processor portion 136 is outputted from the input/output controller 134 to the personal computer 158 via the automatic set-up engine 144.

The personal computer 158 includes a CPU 160, a memory 162, a display 164 corresponding to display means described in claim 7, a keyboard 166 (the display 164 and the keyboard 166 are also seen in FIG. 2), a hard disk 168, a CD-ROM driver 170, a conveying control portion 172, an extension slot 174, and an image compression/decompression portion 176. These components are connected together via a bus 178. The conveying control portion 172 is connected to the film carrier 38 set in the line CCD scanner 14 and controls conveying of the photographic film effected by the film carrier 38. Further, when an APS film is set in the film carrier 38, information read from the magnetic layer of the APS film by the film carrier 38 (for example, print size) is inputted.

A driver (not shown) which effects data reading/writing for a storage medium such as a memory card, or a communication control device which communicates with other information processing equipment is connected via the extension slot 174 to the personal computer 158. When image data to be outputted externally is inputted from the input/output controller 134, the image data is outputted, as an image file, to the outside (for example, to the above-described driver or communication control device) via the extension slot 174. Further, when file image data is inputted from the outside via the extension slot 174, the inputted file image data is outputted to the input/output controller 134 via the automatic set-up engine 144. In this case, the input/output controller 134 outputs the inputted file image data to the selector 132.

Operation

Next, as the operation of the present embodiment, there will be described an operation in the image processing section 16 when a film image recorded on a photographic film is read by the line CCD scanner 14, and based on scan data obtained by the reading, an image is recorded on a photographic printing paper in the laser printer section 18.

As previously stated, a reading operation is performed twice (pre-scan and fine scan) for a film image recorded on a photographic film by the line CCD scanner 14. First, pre-scan processing executed in the image processing section 16 when pre-scan data is inputted to the image processing section 16 after pre-scan has, been effected for an entire photographic film in the line CCD scanner 14 will be described with reference to the flow chart shown in FIG. 4.

In step 200, various processing including dark correction, density conversion, shading correction, and defective-pixel correction is carried out by the line scanner correcting portion 122 for pre-scan data inputted from the line CCD scanner 14. The pre-scan data outputted from the line scanner correcting portion 122 is inputted to the automatic set-up engine 144 via the selector 132. In the subsequent step 202, in the automatic set-up engine 144, a position (a frame position) at which a film image is recorded on a photographic film is determined based on the pre-scan data inputted from the line CCD scanner 14 for each of film images recorded on the photographic film and cutout of pre-scan image data corresponding to the position of the film image recorded from the pre-scan data based on the determined frame position is performed for each of film images recorded on the photographic film.

On the other hand, the digital laboratory system 10 according to the present embodiment also allows a film scanner whose kind is different from that of the line CCD scanner 14 to be connected to the image processing section 16. However, in the above-described structure, scan data inputted to the image processing section 16 delicately differ from one another depending on the kinds of scanners used for reading. This difference is caused by differences between various scanners. In the subsequent step 204, standardization of pre-scan image data is performed in which the kind of a scanner by which scan data is inputted to the image processing section 16 is determined, and in order that data obtained by reading the same photographic film be identical to each other irrespective of the kind of a scanner used for reading, pre-scan image data of each film image is corrected in accordance with the determined kind of the scanner.

In step 206, based on pre-scan image data of each film image, the size of each film image is determined and an image characteristic amount, for example, density of each film image is calculated. Then, based on the size and image characteristic amount of each film image, a reading condition when fine scan for each film image is performed by the line CCD scanner 14 is determined. The calculated reading condition is stored in a RAM 148 so as to correspond to information (for example, a frame number) which identifies each film image, and when fine scan is performed by the line CCD scanner 14, the reading condition is reported to the line CCD scanner 14.

In step 208, based on pre-scan image data of each of film images of a plurality of frames, a processing condition of image processing for image data (fine scan image data) obtained by fine scan in the line CCD scanner 14 is calculated for each film image. The calculated processing condition is stored in the RAM 148 in correspondence with information (for example, a frame number) which identifies each film image, and when the fine scan image data is inputted from the line CCD scanner 14, the processing condition is,reported to the image processor 140 of the image processing portion 136.

In step 210 and subsequent steps, image testing processing is performed in the personal computer 158. Namely, in step 210, pre-scan image data and the processing condition for image processing are fetched from the automatic set-up engine 144, and based on the fetched processing condition, image processing equivalent to that executed for fine scan image data in the image processor 140 is executed for pre-scan image data and simulation image data is thereby generated. In step 212, based on the simulation image data generated in step 210, a simulation image is displayed on the display 164.

FIG. 5 shows an example of display of a simulation image. In FIG. 5, simulation images 300 for film images of six frames are shown and a portion of a photographic film read by the line CCD scanner 14, with film images corresponding to the displayed simulation images 300 being recorded, is shown as an image 302. Further, the film images corresponding to the displayed simulation images 300 on the photographic film shown as the image 302 are indicated in a state of being enclosed by a frame 304. Although not illustrated in FIG. 5, the display 164 also shows thereon a message for requesting, to an operator, testing of images and input of the result of testing.

When a simulation image is displayed on the display 164, the operator visually confirms the simulation image and checks whether a frame position determined by the automatic set-up engine 144 is proper, whether the quality of the simulation image is proper (i.e., whether the processing condition calculated by the automatic set-up engine 144 is proper), and whether execution of cross filter processing (described later in detail) is proper, and further, inputs information representing the result of testing via the keyboard 166.

When any information (instruction) is inputted from the operator via the keyboard 166, the process proceeds to step 214, in which based on the inputted information, it is determined whether correction of a processing condition for a specified simulation image is indicated as the result of testing for the simulation image. When the decision of step 214 is affirmative, the process proceeds to step 216, in which correction information which indicates correction of the processing condition inputted from the operator is outputted to the automatic set-up engine 144 and an instruction for correcting the processing condition of a film image corresponding to the above-described specified simulation image is given to the automatic set-up engine 144.

As a result, in step 208, the automatic set-up engine 144 recalculates (corrects) the processing condition of the film image corresponding to the specified simulation image by considering the correction information inputted from the operator. Then, the steps 210 and 212 are executed again by the personal computer 158, and based on the corrected processing condition, the simulation images 300 are displayed again on the display 164. The operator can easily determine whether contents of previously-input correction information is proper by visually confirming a regenerated specified simulation image.

When the decision of step 214 is negative, the process proceeds to step 218, in which it is determined whether, based on the information inputted by the operator, correction of the frame position for the specified simulation image is indicated as the result of testing for a simulation image. When the decision of step 218 is affirmative, the process proceeds to step 220, in which the correction information for indicating correction of the frame position, which is inputted from the operator, is outputted to the automatic set-up engine 144 and an instruction for correcting the frame position of a film image corresponding to the above-described specified simulation image is given to the automatic set-up engine 144.

As a result, in step 202, the automatic set-up engine 144 corrects the frame position of the film image corresponding to the specified simulation image and executes again cutout of pre-scan image data from the pre-scan data based on the corrected frame position. Then, the operations from step 204 to step 208 are executed again by the automatic set-up engine 144 and the operations of steps 210 and 212 are executed again by the personal computer 158, and as a result, the simulation image 300 of which frame position is corrected is displayed again on the display 164.

Further, when the decision of step 218 is negative, the process proceeds to step 222, and based on the information inputted by the operator, it is determined whether execution of cross filter processing for the specified simulation image has been indicated as the result of testing for a simulation image. When the decision of step 222 is negative, it is determined that the result of testing is "accepted", and therefore, the pre-scan processing ends. As a result, the reading condition and processing condition suitable for each of film images recorded on the photographic film are respectively set.

Figure 6B:
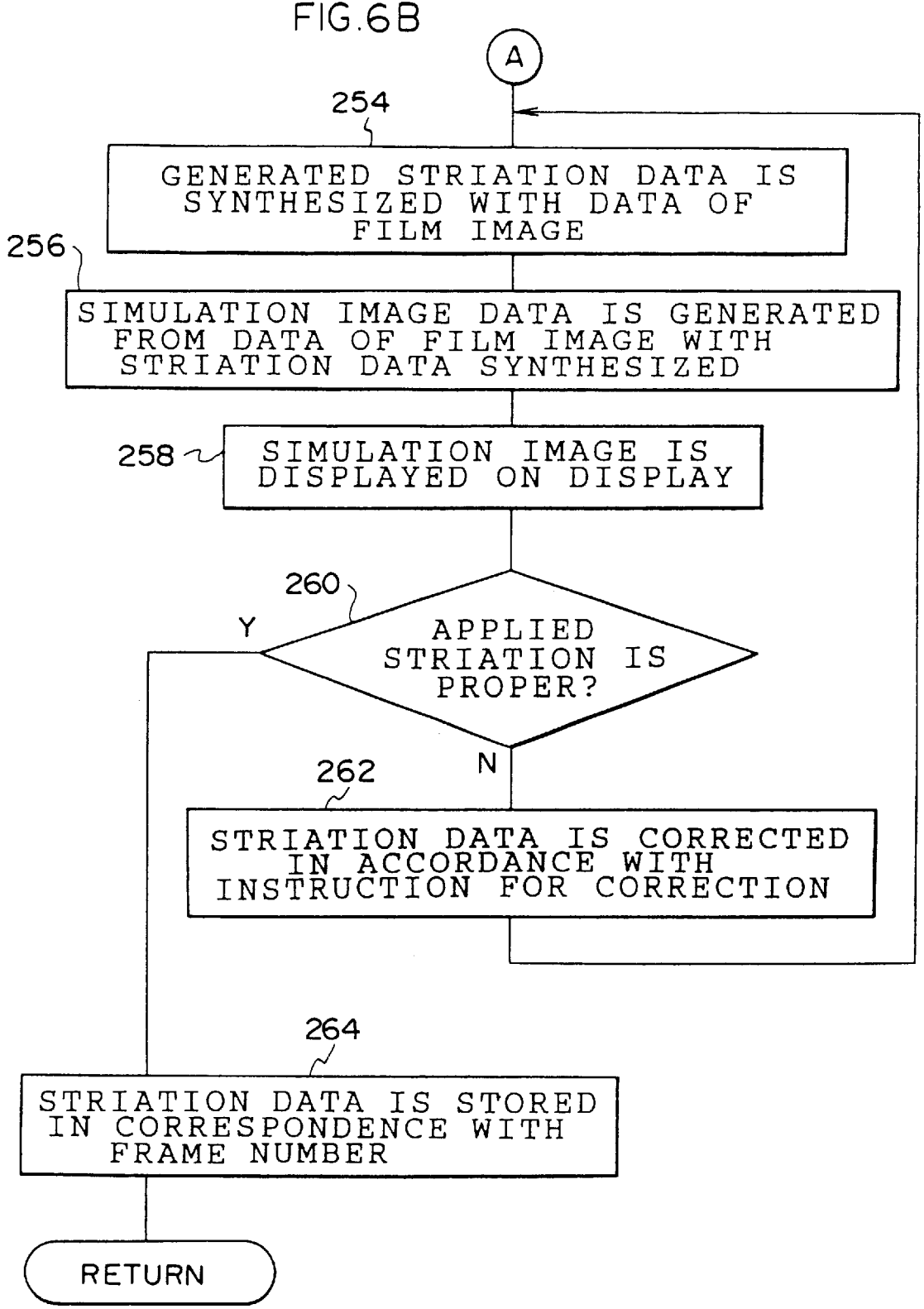

On the other hand, in the above-described testing (verifying) processing, when an instruction for changing the tone of a specified image to that of an image which is as almost the same as an image photographed using a special filter such as a cross filter is given by a user, or when it is determined, by an operator oneself visually observing a simulation image, that changing the tone of the specified image to that of the image which is as almost the same as the image photographed using a special filter such as a cross filter is proper, the operator inputs, via the keyboard 166, information which indicates execution of cross filter processing for the specified: image. As a result, the decision of step 222 is affirmative and the process proceeds to step 224, in which the cross filter processing for the above-described specified image is executed by the personal computer 158. A description will hereinafter be given of the cross filter processing with reference to the flow chart shown in FIG. 6.

The cross filter processing according to the present embodiment is provided to change the tone of a recorded image when a film image to be processed is recorded on a photographic printing paper to that of an image which is as almost the same as the image photographed using a special filter such as a cross filter. Concretely, a bright region (described later in detail) where highlight points concentrate in a film image to be processed is searched out and extracted, and striation data for applying striations, which is similar to that applied to an image by photographing using a cross filter or the like, to a recorded image based on the extracted bright region is generated.

Figure 7A:
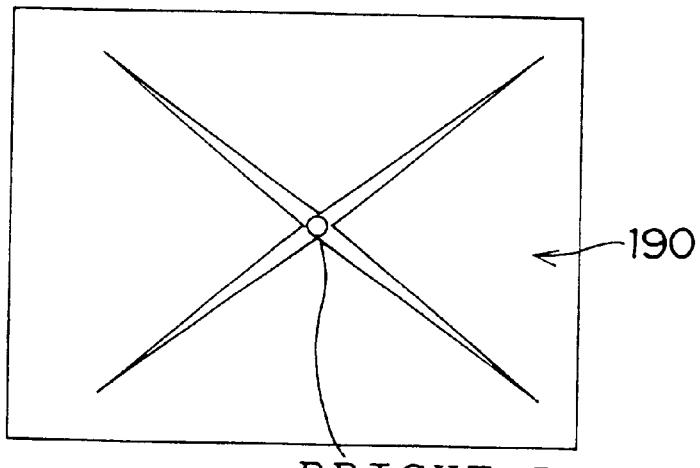
FIGS. 7A, 7B, and 7C are image diagrams each showing an example of striations which are applied to an image by synthesizing image data and striation data.
Figure 7B:
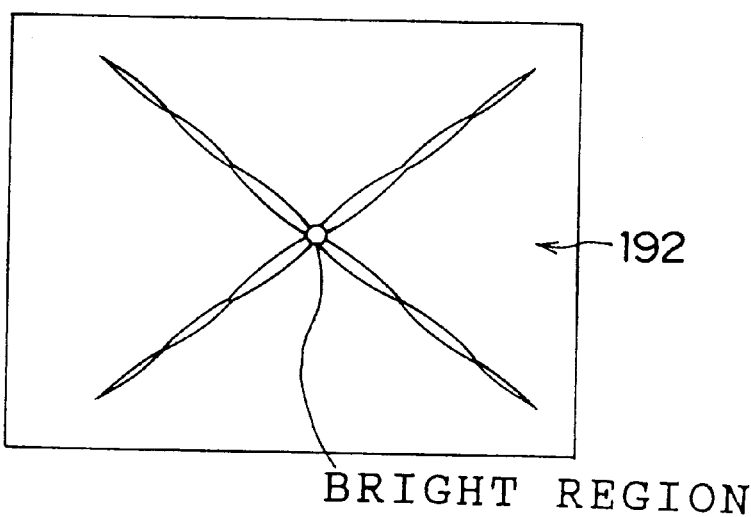
Figure 7C:
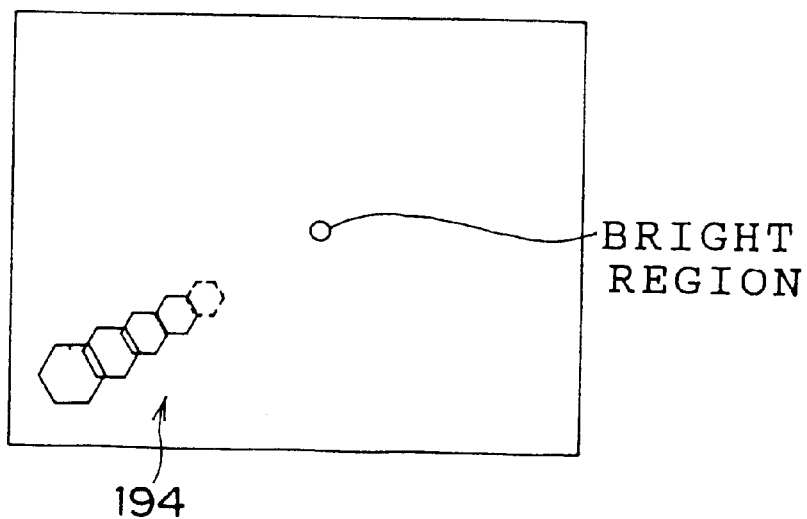

In the present embodiment, various striations are provided as the striation which can be applied to the recorded image. For example, as shown in FIGS. 7A, 7B, and 7C, there are provided the following: a first striation group 190 (see FIG. 7A) in which a plurality of striations extend radially in such a manner that the width thereof is made smaller as the distance from the bright region becomes longer; a first striation group 192 (see FIG. 7B) in which a plurality of striations extend radially in such a manner that the width is gradually made smaller while it periodically varies in accordance with an increase in the distance from the bright region; and a striation 194 (see FIG. 7C) in which a plurality of hexagonal high-luminance regions (another shape may be applied, for example, an N-angled polygon ($N \geq 5$)) are arranged in a line.

Striation data which represents the first striation group 190 and striation data which represents the first striation group 192 each correspond to first striation data described in the third aspect of the present invention, and striation data which represents the striation 194 corresponds to second striation data described in the third aspect of the present invention. In the first striation group 190, the first striation group 192, and the striation 194, the width of any striation changes in accordance with the distance from the bright region, and generation of striation data which represent the above-described striations (the generation of striation data will be described later) corresponds to the invention described in the fifth aspect of the present invention.

In the cross filter processing according to the present embodiment, first, in step 230, a message for requesting inputting informations regarding the kind of striation applied to a recorded image, presence or absence of designation of a search range for designating a range for search of a bright region in a film image to be processed: and presence or absence of designation of the number of a bright region to which striations are applied is displayed on the display 164. The above-described various information is inputted by the operator via the keyboard 166. In step 232, the process is placed in a waiting state until the various information is inputted.

When the message for requesting input of the various information is displayed on the display 164, the operator selects, based on an instruction given by a user or based on a determination made by the operator oneself, the kind of striation to be applied to the recorded image and inputs information which indicates the kind of the selected striation. Further, when it is determined by the operator that striations are required to be applied only to a bright region within a specified range of a film image, or when it is determined by the operator that striations are required to be applied only to a bright region outside the specified range of the film image, the operator inputs information which represents "designation of the search range exists". In other cases, the operator inputs information which represents "no designation of the search range". Moreover, when there is a possibility of a large number of bright regions being extracted and it is determined by the operator that it is not preferable to apply striations to each of the extracted bright regions, the operator inputs information which represents "designation of the number exists" and information which designates the number of bright regions to be extracted. When it is determined by the operator that it is not necessary to limit the number of bright regions to which striations are applied, the operator inputs information which indicates "no designation of the number".

When the various information is inputted as described above, the decision of step 232 is affirmative and the process proceeds to step 234. In step 234, it is determined whether the information which indicates "designation of the search range exists" has been inputted from the operator. When the decision of step 234 is negative, the process proceeds to step 236, in which an entire film image is set as the search range of a bright region for the film image to be processed, and the process further proceeds to step 242. Further, when the decision of step 234 is affirmative, the process proceeds to step 238, the message for requesting designation of the search range of the bright region is displayed on the display 164, the process is placed in a waiting state until the search range of the bright region is designated by the operator via the keyboard 166 (or a pointing device such as a mouse).

In the present embodiment, as a method of designating the search range of the bright region, there are provided a method in which, with a simulation image of a film image to be processed being displayed on the display 164, a line indicating an outer edge of the search range of the bright region is drawn on the simulation image, and a method in which a line indicating an outer edge of a range in which no search for the bright region is performed (non-search range) is drawn. When the message for requesting the designation of the search range is displayed on the display 164, the line which indicates the outer edge of any one of the search range and the non-search range of the bright region is drawn on the displayed simulation image by the operator.

At this time, displaying the simulation image of a film image to be processed corresponds to "displaying, on display means, an image represented by image data prior to recording of an image on a recording material" described in the seventh aspect of the present invention.

When the search range or the non-search range of the bright region is designated as described above, the decision of step 238 is affirmative and the process proceeds to step 240, in which the search range of the bright region is set in accordance with the designation by the operator. Namely, when the search range is designated, the designated range is set as the search range of the bright region. When the non-search range is designated, the range with none of the designated range included is set as the search range of the bright region. The bright region is searched only in the set search range, and therefore, setting of the search range in step 240 corresponds to "selection of a bright region to which striations are applied by striation data in accordance with an instruction inputted based on an image displayed on display means" described in the seventh aspect of the present invention.

In step 242, pre-scan image data which indicates density of a film image to be processed is fetched, and based on the fetched pre-scan image data, highlight points (for example, when a film image is a negative image, the points are pixels whose three-color average density of R, G, and B is a value which is the maximum or is near the maximum, and when a film image is a positive image, pixels whose three-color average density is a value which is the minimum or is near the minimum), which are located within the search range set in step 236 or in step 240, are all extracted. In the subsequent step 244, based on the result of extraction of the highlight points in step 242, a region in which a large number of highlight points concentrate (a region in which a large number of highlight points are located adjacently or closely) is extracted as the bright region in the search range. The extraction of the bright region in the above-described steps 242 and 244 corresponds to the invention described in the second aspect of the present invention.

In step 246, data of the bright region extracted in step 244 is extracted from the pre-scan image data, and based on the extracted data of the bright region, respective characteristic amounts of color tint, brightness, size, and shape of a bright region are calculated for each of bright regions. Meanwhile, as the color tint of the bright region, for example, the difference or ratio of average densities of R, G, and B in the bright region can be used. As the brightness of the bright region, for example, an average density of three colors in the bright region can be used. As the size of the bright region, for example, the number of pixels in the bright region can be used. Further, as the shape of the bright region, complexity e of the shape can be used (see the following expression). The complexity e becomes minimum in a case of a circular region, and as the shape of the bright region becomes complicated, the value of complexity e increases.

$$e = (\text{circumference of bright region})^2 / (\text{area of bright region})$$

In step 248, based on the characteristic amounts calculated for each of the bright regions in step 246 (with the number of the designated bright regions in the case in which "designation of the number exists" considered), the bright region to which striations are applied is selected. The selection of the bright region can be performed by, for example, sequentially applying selective conditions described below.

(1) A bright region which can be determined as a region which is largely different from a circle (for example, a bright region whose complexity e is a predetermined value or greater) is excluded. As a result, a bright region corresponding to a radiator, which is not suitable as a bright region being applied striations thereto, such as fluorescent light can be excluded from the bright regions to which striations are, applied. The selective condition corresponds to the invention described in the sixth aspect of the present invention.

(2) When the number of bright regions left without being excluded in the selective condition (1) is greater than the number of the designated bright regions, any one of brightness and size is compared between the bright regions, and removal of bright regions whose brightness is low or size is small is performed repeatedly until the number of the bright regions comes to that of the designated bright regions. As a result, only the bright regions to which striations are preferably applied are left without being excluded. This selective condition corresponds to "selection of a bright region to which striations are applied by striation data in accordance with an instruction inputted based on an image displayed on display means" described in the seventh aspect of the present invention.

In the case of "no designation of the number" as well, when a bright region whose brightness is a predetermined value or less, or a bright region whose size is a predetermined value or less exists, this bright region may be excluded. Further, a bright region whose color tint is included in a predetermined range on a color coordinate may be excluded. On the contrary, only the bright region whose color tint is included in a predetermined range on a color coordinate may be selected.

When the bright region to which striations are applied is selected as described above, in step 250, based on characteristic amounts of the selected bright region and an average density (LATD) of an entire film image and by considering the kind of the designated striation, a parameter which defines striations applied to the selected bright region is determined. As the parameter, for example, the length, width, and color tint of striations, a cross angle of striations in a case of application of a striation group comprised of a plurality of striations (for example, the first striation group 190 or the first striation group 192 shown in FIG. 7), and the like are used. This step 250 corresponds to a step of "determining a parameter which defines striations" described in the fourth aspect of the present invention.

The length of striations can be set in such a manner that, for example, it increases as the brightness of a bright region becomes high and it also increases as the size of the bright region increases. Further, it is preferable that the striations be shortened as the brightness of an entire recorded image recorded on a photographic printing paper becomes high (namely, in a case of using a negative image as a film image, as LATD of the film image increases). As a result, the appearance of a recorded image becomes attractive.

Further, the width of striations is set in such a manner that it becomes large, for example, as the brightness of a bright region becomes high and as the size of the bright region increases. For example, the striations which form the first striation group 190 shown in FIG. 7A and the first striation group 192 shown in FIG. 7B are formed in such a manner as to be gradually decreased in width as the distance from the bright region increases (the width of the striations which form the first striation group 192 are each made gradually thin while varying the width thereof periodically). Accordingly, the shape of the striations in each of the striation groups is determined by setting the length of the striation and the maximum width of the striation (in this case, in a portion of the striation relatively close to the bright region). In the first striation group 192, a cycle at which the width of the striation varies may also be changed in accordance with the brightness of the bright region and other characteristic amounts.

Further, the striation 194 shown in FIG. 7C is formed such that the width thereof becomes large (the sizes of hexagonal high-luminance regions are made larger) as the distance from the bright region increases. Accordingly, the shape of the striation 194 is also determined by setting the length of the striation and the maximum width of the striation (in this case, in a portion of the striation farthest from the bright region).

The color tint of the striations can be set, for example, so as to coincide with that of a bright region on a recorded image. Further, the color tint of a portion close to the bright region on the striation is determined so as to coincide with that of the bright region on the recorded image, and the color tint of a portion which is relatively separated from the bright region on the striation may be determined so as to periodically change (i.e., hue circle) as the distance from the bright region increases. In this case, a striation which is similar to that applied to an image by photographing using a well-known rainbow-colored filter can be obtained. As described above, generation of striation data which indicates a striation whose color tint changes in accordance with the distance from the bright region (generation of striation data will be described later) corresponds to the invention described in the fifth aspect of the present invention .

As the cross angle of striations, for example, a predetermined angle can be set. Alternatively, when a search for existence of a face region corresponding to a human's face in a film image to be processed is made and the face region exists in the film image, the cross angle of striations may be automatically set so that striations to be applied do not overlap with the face region. By determining the parameter which defines striations as described above, a striation which is indicated by striation data generated in the subsequent step 252 can be approximated to that appearing on a photographed image during photographing with a special filter such as a cross filter used.

In step 252, striation data for applying, to the bright region selected in step 248 (the bright region to which striations are applied), striations of the kind selected by an operator, which are defined by the parameters determined in step 250, is generated. Meanwhile, the striation data may be data of a bit-map type (in this case, the resolution may be matched to any of pre-scan image data and fine scan image data), or may be data of a vector type, which is comprised of data such as a position to which striations are applied in an image, the shape of striation, luminance of striation, color tint, and the like. Step 252 corresponds to "generation of striation data based on the determined parameters" described in the fourth aspect of the present invention.

In step 254, the generated striation data is synthesized with pre-scan image data of a film image to be processed. When the striation data is data of a bit-map type whose resolution coincides with that of fine scan image data, the striation data and the pre-scan image data are synthesized after sampling of the striation data so that the resolution of the striation data coincides with that of the pre-scan image data. In step 256, by effecting processing which is similar to step 210 in the pre-scan processing described above (see FIG. 4) for the pre-scan image data synthesized with the striation data, simulation image data is generated.

In the subsequent step 258, based on the simulation image data generated in step 256, a simulation image to which striations are applied by the striation data is displayed on the display 164 and a message for requesting testing of the displayed simulation image is also displayed on the display 164. As an example, when four bright regions which are each indicated by a mark "●" shown in FIG. 8B are extracted and selected for a film image to be processed shown in FIG. 8A, an image as shown in FIG. 8C is displayed on the display 164. By visually observing the image displayed on the display 164, the operator can easily test as to whether contents of the striation data generated in step 252 is proper (whether the striations applied by the generated striation data are proper).

Meanwhile, displaying the simulation image to which the striations are applied on the display 164 in step 258 corresponds to "displaying, on display means, an image represented by image data synthesized with the striation data prior to recording of an image on a recording material" described in the seventh aspect of the present invention.

When the message for requesting testing is displayed on the display 164, the operator performs testing for the number, position, kind, shape, tint, cross angle of applied striations and determines as to whether the applied striations are proper. When it is determined that the striations applied to the simulation image displayed on the display 164 are not proper, information which indicates correction of the striation data regarding at least any one of the test items described above is inputted via the keyboard 166. As an example, when it is determined that the striation shown at a lower right corner of the image shown in FIG. 8C is not necessary, the operator designates, as indicated by the broken line shown in FIG. 8D, a range in which striations determined as unnecessary ones are located and indicates deletion of the striations located in the designated range.

When any information is inputted from the operator, the process proceeds to step 260, in which it is determined whether, based on the inputted information, a determination that the striations applied to the simulation image are proper be made. When the information which indicates correction of striation data is inputted, the decision of step 260 is negative and the process proceeds to step 262, in which the striation data is corrected in accordance with the inputted information. Thereafter, the processes from step 254 to step 258 are performed repeatedly. Step 262 corresponds to "correction of striation data" described in the seventh aspect of the present invention.

As a result, the striation data corrected in accordance with an operator's instruction is synthesized again with the pre-scan image data and is displayed again, as the simulation image data, on the display 164. For example, when deletion of the striations located in the range indicated by the broken line shown in FIG. 8D is indicated, in step 262, the striation data is corrected so that data corresponding to the striations for which deletion is indicated is deleted, and a simulation image corrected in accordance with an instruction from the operator as shown in FIG. 8E is displayed again on the display 164.

Then, when it is determined that the striations applied to the simulation image displayed on the display 164 are proper, the operator inputs information which indicates that the striations are proper. As a result, the decision of step 260 is affirmative and the process proceeds to step 264, in which the striation data is stored in the memory 162 so as to correspond to information (for example, frame number) which identifies each film image, and the cross filter processing ends. The above-described cross filter processing results in generation (and correction) of the striation data being completed.

On the other hand, when pre-scan for a photographic film has been completed, the line CCD scanner 14 performs fine scan for reading a photographic film for each film image, and during fine scan, a reading condition for each film image is reported from the automatic set-up engine 144 to the line CCD scanner 14. Further, the automatic set-up engine 144 reports, to the image processor portion 136, a processing condition of image processing for fine scan image data calculated for each film image. Moreover, when the above-described cross filter processing is performed in accordance with an instruction from the operator, the personal computer 158 transfers, to the image processor portion 136, striation data generated by the cross filter processing.

Figure 9:
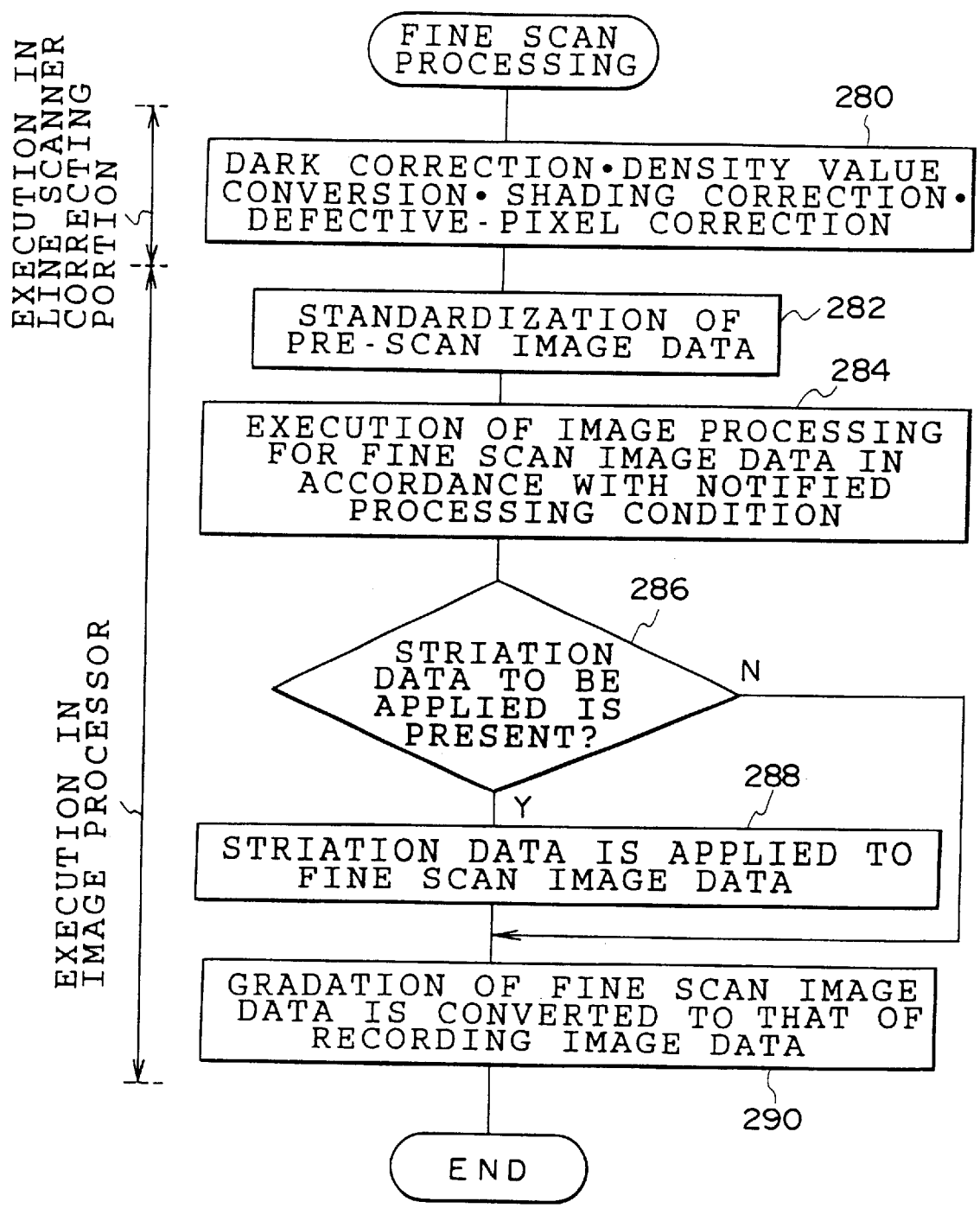
FIG. 9 is a flow chart which shows contents of fine scan processing executed in the image processing section.

Next, fine scan processing executed in the image processing section 16 when reading (fine scan) for respective film images of the photographic film is performed in the line CCD scanner 14 under the reported reading condition and fine scan image data of each film image is inputted to the image processing section 16 will be described hereinafter with reference to the flow chart shown in FIG. 9. Meanwhile, the fine scan processing is performed for fine scan image data of each film image.

In step 280, various processing including dark correction, density conversion, shading correction, and defective-pixel correction is effected by the line scanner correcting portion 122 for fine scan image data inputted from the line CCD scanner 14. The fine image scan data outputted from the line scanner correcting portion 122 is inputted via the selector 132 to the image processor portion 136. In the subsequent step 282, in the image processor portion 136, standardization of the fine scan image data is performed in the same way as in step 204 of the pre-scan processing (see FIG. 4).

In step 284, image processing such as hyper-tone processing and hyper-sharpness processing is performed for the standardized fine scan image data under the processing condition reported from the automatic set-up engine 144. In the subsequent step 286, it is determined whether the striation data to be applied to the fine scan image data which is being presently processed is transferred from the personal computer 158.

When the decision of step 286 is negative, a film image corresponding to the presently-processed fine scan image data is a film image for which execution of the cross filter processing has not been indicated in the pre-scan processing (see FIG. 4). Therefore, the process proceeds to step 290, in which gradation conversion in which a density range of fine scan image data is converted in accordance with a range in which the image data is reproduced as an image on a photographic printing paper, and color conversion in which three-color density balance of an image represented by the fine scan image data is corrected in accordance with variations of characteristics between an exposure amount of the photographic printing paper and coloring density for each color of R, G, and B are carried out, and then, the fine scan processing ends.

On the other hand, when the decision of step 286 is affirmative, the process proceeds to step 288, in which the striation data transferred from the personal computer 158 is synthesized with the fine scan image data in the same way as in step 256 of the cross filter processing (see FIG. 6) (when respective resolutions do not coincide, these data are synthesized after conversion of resolution such as interpolation). In step 290, the above-described gradation conversion and color conversion are performed for the fine scan image data with the striation data synthesized. Meanwhile, execution of the process of step 290 after the process of step 288 as described above corresponds to execution of the gradation conversion, which is used for recording an image on a recording material, for the image data with the striation data synthesized after the striation data is synthesized with the image data described in the eighth aspect of the present invention.

The data subjected to the fine scan processing is transferred, as recording image data, to the laser printer section 18 and is used for exposure and recording of an image on a photographic printing paper. Accordingly, the recording image data with the striation data synthesized in the fine scan processing is recorded on the photographic printing paper as an image whose tone is the same as that of an image photographed using a special filter such as a cross filter, more specifically, an image with striations, which are determined by an operator as proper ones, applied thereto.

As described above, the recording image data with the striation data synthesized is data subjected to gradation conversion after the striation data is synthesized with the fine scan image data, and therefore, gradation conversion is performed simultaneously for the fine scan image data and for the striation data under the same gradation conversion condition. Accordingly, the striations, applied to a recorded image can be prevented from being seen unnaturally.

Figure 8A:
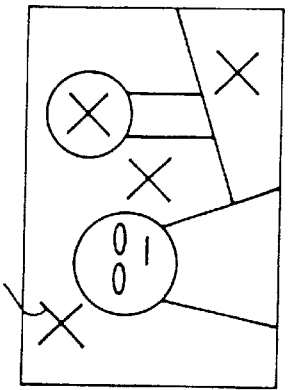
FIGS. 8A, 8B, 8C, 8D, and 8E are image diagrams.
Figure 8B:
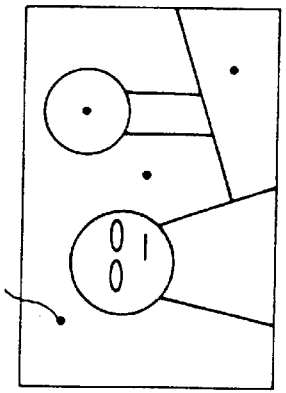
Figure 8C:
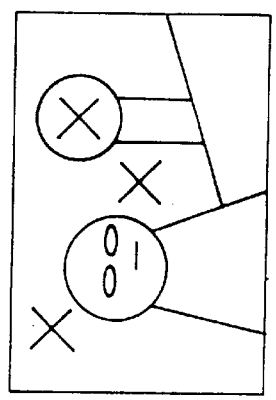
Figure 8D:
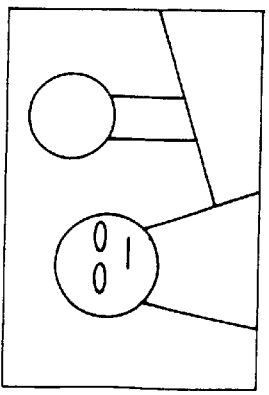
Figure 8E:
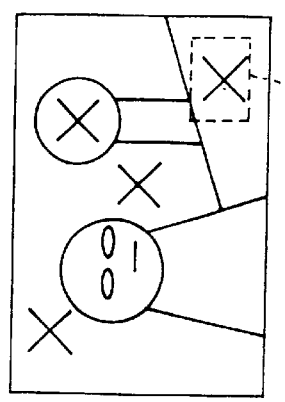

FIGS. 8A and 8B each show a striation group comprised of four striations, but the number of striations for forming the striation group is not limited to four and striation data may be of course used which indicates a striation group in which three or less striations, or five or more striations extend from a bright region.

In the foregoing, there was described the case in which fine scan image data with which striation data is synthesized and which is subjected to gradation conversion or the like is used for recording an image on a photographic printing paper, but the present invention is not limited to the same. The above-described fine scan image data may be stored in a storage medium such as a floppy disk, a hard disk, a photo-magnetic disk, or a memory card.

Further, in the foregoing, striation data is generated by carrying out cross filter processing for an image designated by an operator and striations are applied to a recorded image. However, the present invention is not limited to the same and an image which is designated as that to which striations are applied may be determined by reading information which designates an image to which striations are applied, the information being magnetically, optically, or electrically recorded in a photographic film or in a cartridge.

Moreover, in the foregoing, there was described the embodiment in which the search range of bright regions and the number of bright regions are independently designated by an operator, but the present invention is not limited to the same. When a plurality of search ranges are designated by the operator, the number of bright regions can be designated for each of the search ranges. Alternatively, the bright region itself to which striations are applied can also be designated.

Still further, in the foregoing, there was described the case in which the same kind of striations are applied to a plurality of bright regions in an image to be processed, but the present invention is not limited to the same. For example, by selecting the kind of striations to be applied to each of a plurality of bright regions selected as bright regions to which striations are applied, different kinds of striations can be applied respectively to the plurality of bright regions in the image.

In the foregoing, the case in which striation data is generated based on the kind of striations designated by the operator and various parameters determined in step 250 was described as an example, but the present invention is not limited to the same. For example, with many kinds of striation data being generated in correspondence with the kind of striations or a combination of parameters and being stored in advance in a storage medium such as a hard disk 168, striation data used based on the designated kind of striations or various parameters may be selected from the many kinds of striation data.

In addition, in the foregoing, there was described the case in which an operation relating to the image processing method of the present invention is carried out by a digital laboratory system, but the present invention is not limited to the same. The operation relating to the image processing method of the present invention can also be carried out by allowing a digital camera or an information processor such as a personal computer to have a function to effect the above-described operation and by a user oneself making various.

The embodiment of the present invention was described as above, but the above-described embodiment includes a mode for carrying out the invention, which will be described later, in addition to the modes for carrying out the invention described in the aspects of the present invention.

An image processing apparatus comprising extracting means for extracting a bright region in an image based on image data and synthesizing means for synthesizing, based on the bright region extracted by the extraction means, striation data indicating striations extending from the bright region with the image data.

As described above, according to the invention described in the first aspect of the present invention, a bright region in an image is extracted based on image data, and based on the extracted bright region, striation data which represents striations extending from the bright region is synthesized with image data. Accordingly, an excellent effect in that an image similar to that of which tone is intentionally changed using a special filter can be easily obtained without using the special filter is achieved.

The invention described in the fourth aspect of the present invention is provided in such a manner that, in the invention of the first aspect of the present invention, a parameter which defines a striation is determined based on at least one characteristic amount of the brightness, size, and color tint of a bright region, and based on the determined parameter, striation data is generated or selected. Accordingly, in addition to the above-described effect, an effect in that the striation data is synthesized with the image data to prevent striations applied to an image from causing unnaturalness during visual observation of the image is achieved.

The invention described in the fifth aspect of the present invention is provided in such a manner that, in the invention described in the first aspect of the present invention, at least one of the width and color tint of striation is changed in accordance with a distance from a bright region. Accordingly, in addition to the above-described effects, an effect in that various kinds of striations applied to photographed images can be reproduced using various special filters is achieved.

The invention described in the sixth aspect of the present invention is provided in such a manner that, in the invention of the first aspect, a bright region to which striations are applied is selected based on the shape of the bright region. Accordingly, in addition to the above-described effects, an effect in that the striations can be applied to an image represented by image data without causing unnaturalness is achieved.

The invention described in the seventh aspect of the present invention is provided in such a manner that, in the invention of first aspect, prior to recording an image on a recording material, an image represented by image data or image data with striation data synthesized is displayed and a bright region to which striations are applied by the striation data is selected in accordance with an instruction inputted based on the displayed image, so as to allow generation, selection, or correction of the striation data. Accordingly, in addition to the above-described effects, an effect in that the striations can be applied to an arbitrary bright region among extracted bright regions and an image in which the striations are applied to a desired bright region can be obtained is achieved.

The invention described in the eighth aspect of the present invention is provided in such a manner that, in the invention of the first aspect, after striation data is synthesized with image data, gradation conversion used for recording an image on a recording material is performed. Accordingly, in addition to the above-described effects, an effect in that striations represented by the striation data can be prevented from causing unnaturalness is obtained.

What is claimed is:

1. An image processing method comprising the steps of:
    extracting a bright region in an image based on image data;
    determining if a striation is applied to the extracted bright region on the basis of a shape of the extracted bright region, said striation extending from the bright region; and
    synthesizing striation data representing striations extending from the bright region with the image data if the striation is determined to be applied to the extracted region in the determining step.

2. An image processing method according to claim 1, wherein highlight points in an image are extracted based on the image data and a region in which highlight points concentrate is extracted as a bright region in the image.

3. An image processing method according to claim 1, wherein at least one of a first striation data which indicates a plurality of striations extending from the bright region in a radial manner and a second striation data which indicates a striation extending from the bright region and including polygonal high-luminance regions is used as the striation data.

4. An image processing method according to claim 1, wherein parameters which define a striation to be synthesized are determined based on characteristic amounts of at least one of the brightness, size, and color tint of the extracted bright region, and the striation data is generated or selected based on the determined parameters.

5. An image processing method according to claim 1, wherein the striation data is generated in such a manner that at least one of the width and color tint of a striation varies in accordance with the distance from the bright region.

6. An image processing method according to claim 1, wherein based on the shape of each the extracted bright regions, a bright region to which a striation is applied by the striation data is selected from the extracted bright regions.

7. An image processing method according to claim 1, wherein image data with the striation data synthesized any one of is used for recording an image on a recording material or is stored in an information storage medium,
    prior to any one of recording an image an recording material or storing in an information storage medium, an image represented by any one of image data or image data with the striation data synthesized is displayed on display means, and
    a bright region to which striations are applied according to the striation data is selected in accordance with an instruction inputted on the basis of the image displayed on the display means, and any one of generation, selection, and correction of the striation data is performed so that the striation data is synthesized with the image data.

8. An image processing method according to claim 1, wherein after the striation data is synthesized with the image data, the image data with the striation data synthesized is subjected to gradation conversion used for recording an image on a recording material.

9. An image processing method according to claim 1, wherein the striation data is synthesized to the image data in a case that the extracted bright region has a predetermined shape.

10. An image processing method according to claim 1, wherein the striation data is synthesized to the image data on the, basis of complexity of the shape of the extracted bright region.

11. An image processing method according to claim 10, wherein the complexity is represented by the following equation: (a circumferential length of the bright region)$^2$/(an area of the bright region), and the striation data is not synthesized to the image data when the calculated complexity is more than a predetermined value.

12. The image processing method according to claim 1, further comprising:
    using said image data with the synthesize striation data for at least one of recording an image on a recording material and storing said image data in an information storage medium after said simulation image is displayed on said display.

13. The image processing method according to claim 12, further comprising selecting a bright region to which striations are applied according to the striation data in accordance with said instruction inputted from the input device and based on the simulation image displayed on the display.

14. An image processing method comprising the steps of:
    extracting at least one bright region in an image based on image data;
    synthesizing striation data with the image data based on the extracted bright region, said striation data representing striations extending from the bright region, wherein said striation data includes first striation data which indicates a plurality of striations extending from the bright region in a radial manner, and second striation data which indicates a striation extending from the bright region and including polygonal high-luminance regions.

15. The image processing method according to claim 14, wherein highlight points in an image are extracted based on the image data and a region in which highlight points concentrate is extracted as the bright region in the image.

16. The image processing method according to claim 14, wherein parameters which define a striation to be synthesized are determined based on characteristic amounts of at least one of the brightness, size, and color tint of the at least one extracted bright region, and the striation data is generated or selected based on the determined parameters.

17. The image processing method according to claim 14, wherein the striation data is generated in such a manner that at least one of the width and color tint of a striation varies in accordance with the distance from the at least one extracted bright region.

18. The image processing method according to claim 14, wherein said at least one extracted bright region includes a plurality of extracted bright regions, and, based on the shape of the extracted bright regions, a bright region to which a striation is applied by the striation data is selected from the extracted bright regions.

19. The image processing method according to claim 14, wherein after the striation data is synthesized with the image data, the image data with the striation data synthesized is subjected to gradation conversion used for recording an image on a recording material.

20. The image processing method according to claim 14, wherein said method is performed with an image processor, said image processor provided by at least one of digital laboratory system with a display, a personal computer with a display and a digital camera with a display.

* * * * *